United States Patent
Shinohara

(10) Patent No.: US 10,401,822 B2
(45) Date of Patent: Sep. 3, 2019

(54) START LIMITING DEVICE AND MACHINE TOOL

(71) Applicants: CITIZEN WATCH CO., LTD., Tokyo (JP); CITIZEN MACHINERY CO., LTD., Nagano (JP)

(72) Inventor: Takanori Shinohara, Nagano (JP)

(73) Assignees: CITIZEN WATCH CO., LTD., Tokyo (JP); CITIZEN MACHINERY CO., LTD., Nagano (JP)

(*) Notice: Subject to any disclaimer, the term of this patent is extended or adjusted under 35 U.S.C. 154(b) by 152 days.

(21) Appl. No.: 14/778,565

(22) PCT Filed: Mar. 13, 2014

(86) PCT No.: PCT/JP2014/056734
§ 371 (c)(1),
(2) Date: Sep. 18, 2015

(87) PCT Pub. No.: WO2014/148359
PCT Pub. Date: Sep. 25, 2014

(65) Prior Publication Data
US 2016/0282834 A1 Sep. 29, 2016

(30) Foreign Application Priority Data

Mar. 22, 2013 (JP) ................. 2013-060326

(51) Int. Cl.
*G06F 21/00* (2013.01)
*G05B 19/18* (2006.01)
*G05B 19/406* (2006.01)

(52) U.S. Cl.
CPC ........... *G05B 19/182* (2013.01); *G05B 19/18* (2013.01); *G05B 19/406* (2013.01); *G05B 2219/45136* (2013.01)

(58) Field of Classification Search
None
See application file for complete search history.

(56) References Cited

U.S. PATENT DOCUMENTS

| | | | |
|---|---|---|---|
| 6,609,207 B1* | 8/2003 | Cromer | G06F 21/31 710/301 |
| 2003/0073448 A1 | 4/2003 | Ozeki et al. | |

(Continued)

FOREIGN PATENT DOCUMENTS

| JP | 2004-229153 A | 8/2004 |
|---|---|---|
| JP | 2008-083833 A | 4/2008 |

(Continued)

OTHER PUBLICATIONS

Taiwan Intellectual Property Bureau Ministry of Economic Affairs, Office Action for Taiwanese patent application No. 103110309, dated Apr. 10, 2017.

(Continued)

*Primary Examiner* — Paul B Yanchus, III

(57) ABSTRACT

This start limiting device (1) is provided with a start prohibiting means (11) which prohibits starting a device (2) when movement of said device (2) is detected, and a start prohibition releasing means (14) which releases the prohibition by the start prohibiting means (11) on starting the device (2); when movement of said device (2) is detected, the start prohibiting means (11) prohibits starting the device (2) such that the prohibition on starting the device can be released by the start prohibition releasing means (14). This start limiting device (1) is provided with a command receiving means (12) which receives a prescribed command, and the start prohibition releasing means (14) is configured to release the prohibition on starting the device until it is determined that a prescribed time condition has been satis- (Continued)

fied from the time that the command receiving means (12) receives the aforementioned command.

9 Claims, 3 Drawing Sheets

(56) References Cited

U.S. PATENT DOCUMENTS

| | | | |
|---|---|---|---|
| 2008/0150677 | A1 | 6/2008 | Arakawa |
| 2008/0263643 | A1* | 10/2008 | Jaiswal .................. G06F 21/31 726/6 |
| 2010/0057243 | A1 | 3/2010 | Stencel et al. |
| 2011/0285499 | A1 | 11/2011 | Nakamachi et al. |
| 2011/0305337 | A1* | 12/2011 | Devol .................. G06F 21/305 380/259 |
| 2012/0029866 | A1* | 2/2012 | Ono ........................ G01P 1/127 702/141 |

FOREIGN PATENT DOCUMENTS

| | | |
|---|---|---|
| JP | 2009-087084 A | 4/2009 |
| JP | 2009-129151 A | 6/2009 |
| JP | 2009-129199 A | 6/2009 |
| JP | 2009-251694 A | 10/2009 |
| JP | 2010-003210 A | 1/2010 |
| JP | 2010-102880 A | 5/2010 |
| JP | 2011-242988 A | 12/2011 |
| JP | 5101338 B2 | 12/2012 |

OTHER PUBLICATIONS

Japan Patent Office, Office Action for Japanese patent application No. 2013-060326, dated Aug. 16, 2016.
International Search Report for PCT/JP2014/056734, dated Jun. 17, 2014.
European Patent Office, Extended European Search Report for EP patent application No. 14768285.0, dated Oct. 27, 2016.
State Intellectual Property Office of the People's Republic of China, Office Action for Chinese patent application No. 201480017556.X, dated Feb. 22, 2017.
Written Opinion of the International Searching Authority for PCT/JP2014/056734, dated Jun. 17, 2014.
State Intellectual Property Office of the People's Republic of China, Office Action for Chinese patent application No. 201480017556.X, dated Nov. 1, 2017.
The State Intellectual Property Office of the People's Republic of China, Third Office Action, dated May 22, 2018.

* cited by examiner

START LIMITING DEVICE AND MACHINE TOOL

FIELD

The present invention relates to a start limiting device that limits the start of relocated equipment, and a machine tool including the start limiting device.

BACKGROUND

For a machine tool (hereinafter, sometimes referred to simply as "equipment"), a device has been proposed which prevents relocation of a machine tool, such as relocation from the current owner to a third party or relocation to another country, by limiting the start of the machine tool when relocation of the machine tool is detected (e.g., see Patent Document 1).

The above-described device includes an operation limiting unit configured to permit an operation of a machine tool during a period of time from when a relocation detection unit detects relocation until a determination unit determines that a predetermined time condition is met, and to limit the operation of the machine tool in the case where the determination unit determines that the predetermined time condition is met.

RELATED DOCUMENTS

[Patent Document 1] Japanese Patent No. 5101338

SUMMARY

Technical Problem

According to the invention described in Patent Document 1, in order to avoid a disadvantage that the use of the machine is immediately prohibited when relocation is detected, during a predetermined period of time, the operation is permitted even after the relocation of the machine tool is detected instead of immediately disabling the machine tool after the relocation of the machine tool is detected, and the operation of the machine tool is limited after the above-described predetermined period of time elapses.

However, according to the invention described in Patent Document 1, when the relocation of the machine tool is detected, the above-described predetermined period of time begins to elapse automatically. As a result, depending on the relationship between the relocation day and holiday, for example, such as in the case where relocation is carried out immediately before consecutive holidays or at the beginning of consecutive holidays, the above-described predetermined period of time during which the operation of the machine tool is permitted temporarily overlaps with consecutive holidays, or the operation of the machine tool is permitted on holidays on which no task is originally scheduled, or the above-described predetermined period of time expires and the machine tool can no longer be used when the holidays end and the business day begins.

Further, for example, in the case where the relocation of the machine tool is detected erroneously by regarding the vibrations of an earthquake as the vibrations accompanying the relocation of the machine tool, a user may be forced to abort the task even if the user does not suffer from the earthquake if the maker (dealer) has suffered from the earthquake and it is not possible for the maker (dealer) to issue the password to restart the machine tool or to dispatch a service person to restart the machine tool for a long period of time.

In view of the above-described problems, an object of the present invention is to provide a start limiting device capable of avoiding a disadvantage of a user of a machine tool as well as preventing an unauthorized relocation of the machine tool, and a machine tool including the start limiting device.

Solution to Problem

In order to implement the above-described object, in the present invention, a start limiting device includes a start prohibition unit configured to prohibit the start of equipment when the relocation of the equipment is detected and a start prohibition releasing unit configured to release the prohibition of the start of the equipment by the start prohibition unit, and prohibits the start of the equipment by the start prohibition unit in such a manner that the start prohibition of the equipment can be released by the start prohibition releasing unit when the relocation of the equipment is detected, and the start limiting device includes a command reception unit configured to receive a predetermined command, and the start prohibition releasing unit is configured so as to release the prohibition of the start of the equipment from when the command reception unit receives the above-described command until it is determined that a predetermined time condition is met.

It may also be possible to configure the start prohibition unit so as to release the start prohibition of the equipment when a start password set in advance to the equipment is input, and the above-described command may be a command different from the start password.

It may also be possible for the start limiting device to include a time condition determination unit configured to determine whether the above-described time condition is met, and for the time condition determination unit to count the period of time during which the turned-on state of the power source of the equipment continues as one count and to determine that the above-described time condition is met when the counted number of counts reaches a predetermined number of times.

It may also be possible to configure the time condition determination unit so as to count one when a predetermined time elapses after the power source of the equipment is turned on.

The above-described command may be a temporary prohibition releasing password that is input to the command reception unit via an input device.

The temporary prohibition releasing password may be set in common to a plurality of pieces of equipment.

It may also be possible to configure the start limiting device so as to include a command output unit configured to output the above-described command when a predetermined operation is carried out, and to configure the command reception unit so as to receive the above-described command from the command output unit.

Further, according to the present invention, the machine tool includes the above-described start limiting device.

Advantageous Effects of Invention

According to the present invention, it is possible to implement a start limiting device capable of avoiding a disadvantage of a user of equipment, such as a machine tool, as well as preventing an unauthorized relocation of equipment, such as a machine tool.

In particular, after the relocation of equipment, such as a machine tool, is detected, the prohibition of the start of the machine tool whose start is prohibited by the start prohibition unit is released and the start of the equipment is permitted from when the command reception unit receives a predetermined command until it is determined that a predetermined time condition is met, and therefore it is possible for a user to adjust the period of time during which the start of the equipment is permitted by transmitting the above-described predetermined command to the command reception unit at desired timing.

As a result, even in the case where the equipment is relocated immediately before consecutive holidays or at the beginning of the consecutive holidays, or erroneous detection of the relocation of the equipment occurs by vibrations or the like of an earthquake, it is possible for a user to take measures to stop the operation of the equipment during holidays and cause the equipment to operate temporarily when the business day begins by inputting the above-described predetermined command to the command reception unit on the business day after the consecutive holidays, and therefore an economical advantage is obtained.

Further, in the case where the start prohibition unit is configured so as to release the start prohibition of the equipment by the input of the start password set in advance to the equipment, by inputting the command to the command reception unit by taking into consideration the business days of the maker (dealer) that issues the start password, it is possible to request the maker (dealer) or the like to issue the start password or to dispatch a service person to restart the equipment during the period of time during which the start prohibition of the equipment is released, and therefore it is possible to take measures to keep the period of time during which the equipment cannot be restarted to a minimum.

Furthermore, when it is erroneously detected that the equipment is relocated by vibrations or the like of an earthquake, even in the case where the maker (dealer) has suffered from a great earthquake and it is not possible for the maker (dealer) to issue the start password to restart the equipment or to dispatch a service person to restart the equipment for a long period of time, by inputting the command to the command reception unit by taking into consideration the state of recovery of the maker (dealer), it is also possible to appropriately permit the start of the equipment during the period of time from when the maker (dealer) has suffered from the earthquake until its recovery, and therefore it is possible to reduce economical loss, since it is not possible to obtain the start password to restart the equipment or it is not possible to cause the maker (dealer) to dispatch a service person to restart the equipment.

DESCRIPTION OF EMBODIMENTS

Figure 1:
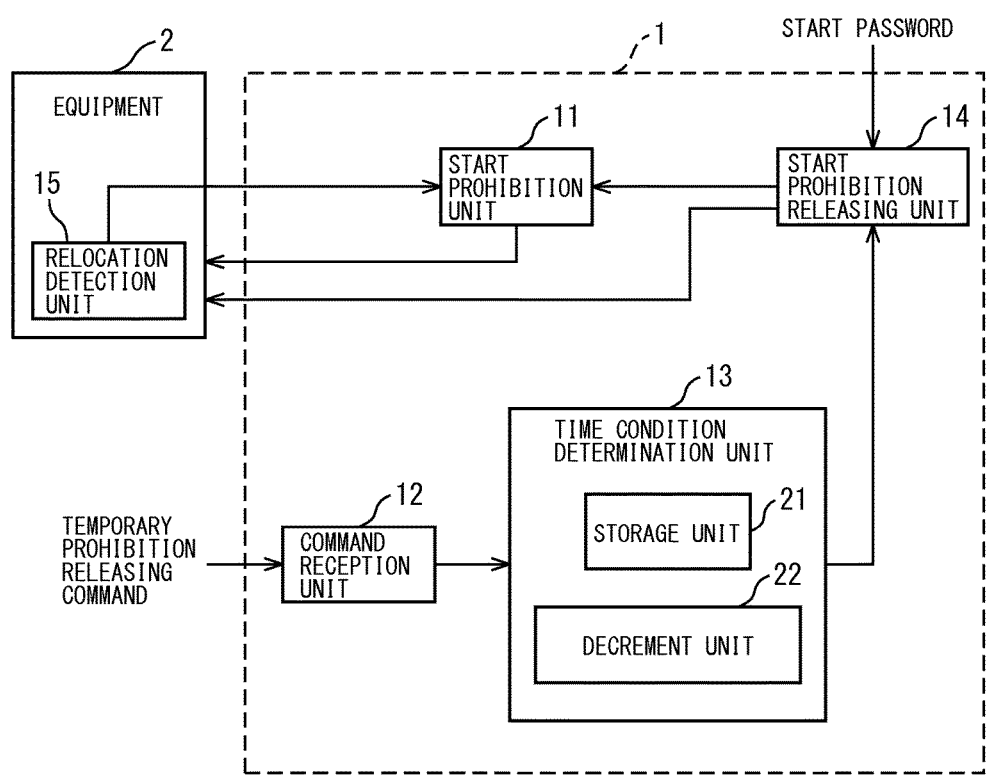
FIG. 1 is a principle block diagram of a start limiting device according to an embodiment of the present invention.

FIG. 1 is a principle block diagram of a start limiting device according to an embodiment of the present invention. In the following, it is assumed that the components to which the same reference symbols are attached in different drawings mean those having the same functions.

A start limiting device 1 according to the present invention includes a start prohibition unit 11, a command reception unit 12, a time condition determination unit 13, and a start prohibition releasing unit 14. As equipment 2 whose relocation is to be managed by the start limiting device 1, there is a machine tool. The equipment 2 is provided with a relocation detection unit 15.

The start prohibition unit 11 prohibits the start of the equipment 2 when the relocation of the equipment 2 is detected and commands a control unit (not illustrated) configured to centrally control the operation of the equipment 2 to prohibit the start. When a start password set in advance to the equipment 2 is input to the start prohibition releasing unit 14 from the outside, the start prohibition of the equipment 2 by the start prohibition unit 11 is released. It is possible to set a different start password each time the start prohibition is released. Even for the same equipment, the start password differs each time the prohibition is released and it is not possible to use the previous start password. The start prohibition releasing unit 14 will be described later.

The command reception unit 12 receives a temporary prohibition releasing command. The temporary prohibition releasing command is a command to release the prohibition of the start of the equipment 2 whose start is prohibited by the start prohibition unit 11 for a predetermined period of time. The temporary prohibition releasing command is, for example, a temporary prohibition releasing password that is input to the start limiting device 1 via an input device (not illustrated), such as a keyboard and a ten key. The temporary prohibition releasing password is a password different from the start password set in advance to the equipment 2 and is a command different from the above-described start password set in advance to the equipment 2.

The time condition determination unit 13 determines whether a predetermined time condition is met after the command reception unit 12 receives a temporary prohibition releasing command. The time condition determination unit 13 counts the period of time during which the turned-on state of the power source of the equipment 2 continues as one count and determines that the "predetermined time condition" is met when the counted number of counts reaches a predetermined number of times. Here, the "predetermined time condition" is the length of a finite period of time that is measured after the temporary prohibition releasing command is issued and the determination processing is carried out as follows by using a storage unit 21 and a decrement unit 22 provided within the time condition determination unit 13.

First, in the storage unit 21, the initial value of the number of counts when the period of time during which the turned-on state of the power source of the equipment 2 continues is specified as one count is stored in advance. The decrement unit 22 decrements the number of counts stored in the storage unit 21 one by one each time the power source of the equipment 2 is switched from the turned-off state to the turned-on state after the command reception unit 12 receives the temporary prohibition releasing command. One period of time (number of times the power source is turned on) from when the power source of the equipment 2 is turned on until the power source is turned off is counted as "one count", by providing the decrement unit 22. The time condition determination unit 13 determines that the above-described predetermined time condition is met when the number of counts stored in the storage unit 21 becomes zero. For example, it may also be possible for the maker (dealer) of the equipment 2 to arbitrarily set the initial value of the number of counts stored in the storage unit 21, and specifically, it can be thought that the initial value is set in accordance with the operation time of the factory where the equipment 2 is set, the condition of the contract with a user, etc. For example, in the case where the initial value of the number of counts stored in the storage unit 21 is set to "5", if one period of time from when the power source of the equipment 2 is turned on until the power source is turned off is repeated five times, the time condition determination unit 13 determines that the above-described predetermined time condition is met. Normally, "one period of time from when the power source of the equipment 2 is turned on until the power source is turned off" almost corresponds to the operation time of the equipment 2 a day, and therefore it is possible for the maker (dealer) to obtain substantially the same effect as that obtained by managing the number of days during which a user can use the equipment 2 temporarily after the relocation by appropriately setting the initial value of the number of counts stored in the storage unit 21.

In the method in which the number of counts stored in the storage unit 21 is decremented one by one each time the power source of the above-described equipment 2 is switched from the turned-off state to the turned-on state, the number of counts is not decremented unless the power source of the equipment 2 is turned off. Thus, it is preferable to configure the method so that a timer (not illustrated) for measuring the elapsed time after the power source of the equipment 2 is turned on is provided and the decrement unit 22 decrements the number of counts stored in the storage unit by one also when the time measured by the timer reaches a predetermined time. In this case, the decrement unit 22 decrements the number of counts stored in the storage unit 21 by one not only each time the power source of the equipment 2 is switched from the turned-on state to the turned-off state but also when a predetermined time elapses after the power source of the equipment 2 is turned on after the command reception unit 12 receives the above-described predetermined command. For example, it may also be possible for the maker (dealer) of the equipment 2 to arbitrarily set the time defined as "one count" after the power source of the equipment 2 is turned on, and it can be thought that the time is set in accordance with, for example, the operation time of the factory where the equipment 2 is set, the condition of the contract with a user, etc., and for example, it may be possible to set 8 hours, 12 hours, 24 hours, etc. Further, if the power source is switched from the turned-off state to the turned-on state a plurality of times on the same day, the number of times is counted and the number of counts is decremented, and therefore it may also be possible to configure the method so that in the case where the power source is switched between the turned-off state and the turned-on state a plurality of times, if the date changes to the next, which can be determined based on the date on which the power source is turned off and the date on which the power source is turned on, the number of counts is decremented and otherwise, the plurality of times of switching is counted as one time.

The start prohibition releasing unit 14 releases the prohibition of the start of the equipment 2 whose start is prohibited by the start prohibition unit 11 during the period of time from when the command reception unit 12 receives the temporary prohibition releasing command until the time condition determination unit 13 determines that the above-described predetermined time condition is met. The start prohibition releasing unit 14 also releases the prohibition of the start of the equipment 2 when the start password set in advance to the equipment 2 is input from the outside. When the start password is input to the start prohibition releasing unit 14, the start prohibition is released regardless of the presence/absence of the temporary prohibition releasing command or whether the start prohibition is temporarily released. After the time condition determination unit 13 determines that the above-described predetermined time condition is met, the start prohibition unit 11 prohibits the start of the equipment 2 until the start password set in advance to the equipment 2 is input.

The relocation detection unit 15 is provided within the equipment 2 and configured so as to detect the presence/absence of the relocation of the equipment 2. The method itself for detecting the relocation of the equipment 2 by the relocation detection unit 15 does not limit the present invention and it is possible to make use of the methods publicly known conventionally, such as the method for detecting the relocation of the equipment 2 based on a radio signal of the GPS or the like, which is received from the outside, the method for detecting the relocation of the equipment 2 by vibrations, and the method for detecting the relocation of the equipment 2 by providing a switch on the bottom surface of the equipment 2 and by detecting the turning on of the switch, which takes place when the equipment 2 is separated from the installation surface.

Figure 2:
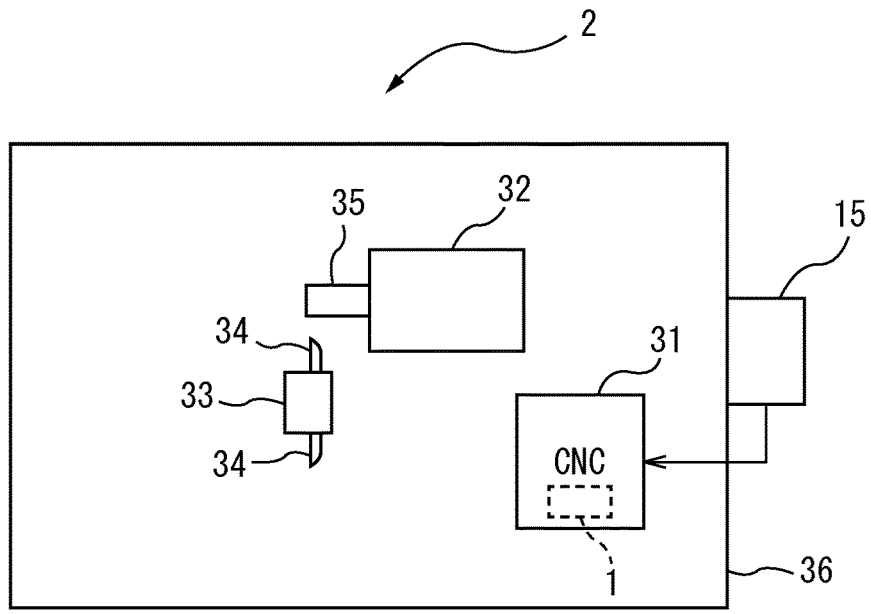
FIG. 2 is a general plan view explaining an arrangement example of the start limiting device according to the embodiment of the present invention in a machine tool.

FIG. 2 is a general plan view explaining an arrangement example of the start limiting device according to the embodiment of the present invention in a machine tool. In this example, the equipment 2 is a machine tool, such as an automatic lathe. The equipment 2 has a configuration publicly known conventionally in which a computer numerical control (CNC) device 31 is provided and based on the control of the CNC device 31, a main shaft 32 and a cutter holder 33 move, and a material 35 gripped by the main shaft 32 is machined into a predetermined shape by a machining tool 34 mounted to the cutter holder 33. The configuration of the automatic lathe is publicly known conventionally, and therefore a detailed explanation is omitted. The relocation detection unit 15 in the embodiment of the present invention is attached to the equipment 2.

Figure 3:
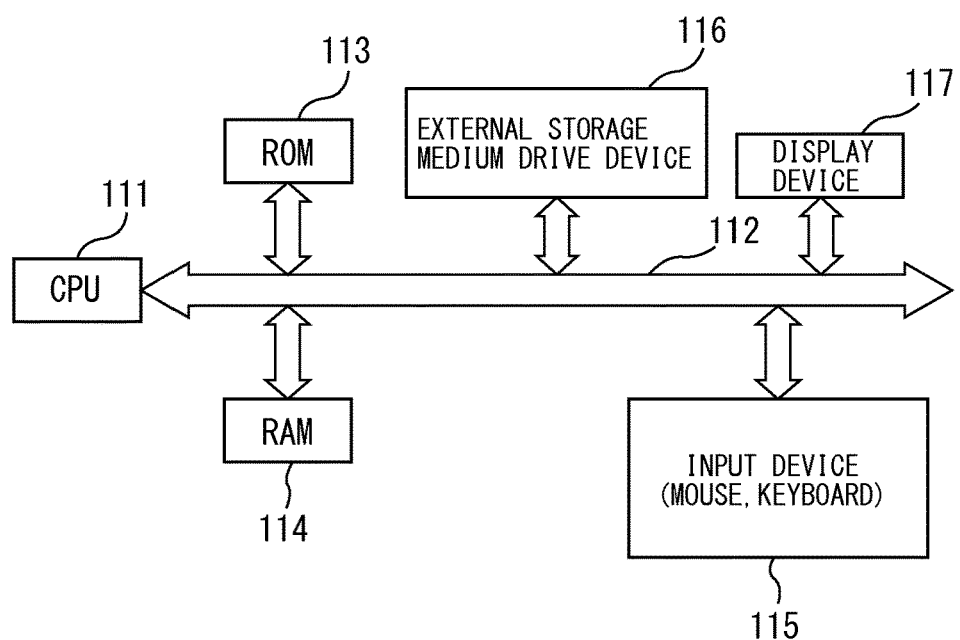
FIG. 3 is a block diagram illustrating a configuration of the start limiting device according to the embodiment of the present invention, which operates by the program stored in a storage medium.

The start limiting device 1 is mounted in the CNC device 31 that centrally controls the operation of the equipment 2, and the start prohibition unit 11, the command reception unit 12, the time condition determination unit 13, and the start prohibition releasing unit 14 within the start limiting device 1 are implemented in the form of computer program that the operation processing unit within the CNC device 31 can execute. FIG. 3 is a block diagram illustrating a configuration of the start limiting device according to the embodiment of the present invention, which operates by the program stored in a storage medium.

A program (hereinafter, referred to as a "start limiting program") that causes a computer to carry out the operation of the start limiting device 1 according to the embodiment of the present invention is stored in a ROM 113 as illustrated in FIG. 3 and functions, for example, as the start limiting device 1 in the operation processing unit within the CNC device 31 with the configuration as will be explained next.

A CPU 111 controls the operation of the start limiting device 1 as well as centrally controlling the entire operation of the equipment 2. The ROM 113, a RAM 114, an input device 115, such as a mouse and a keyboard, an external storage medium drive device 116, and a display device 117, such as an LCD, a CRT, a plasma display, and an organic EL, are connected to the CPU 111, via a bus 112. The control program of the CPU 111 is stored in the ROM 113.

The start limiting program is stored in advance in the ROM 113.

When the power source of the equipment 2 is turned on and the start limiting program is started in the CNC device 31, the CNC device 31 carries out the function of the start limiting device. As described above, it is possible for a user to temporarily release the prohibition of the start of the equipment 2 by inputting the temporary prohibition releasing password via the input device 115 in accordance with the contents of the task and the procedure in a dialogue form, which are displayed on the display device 117.

Figure 4:
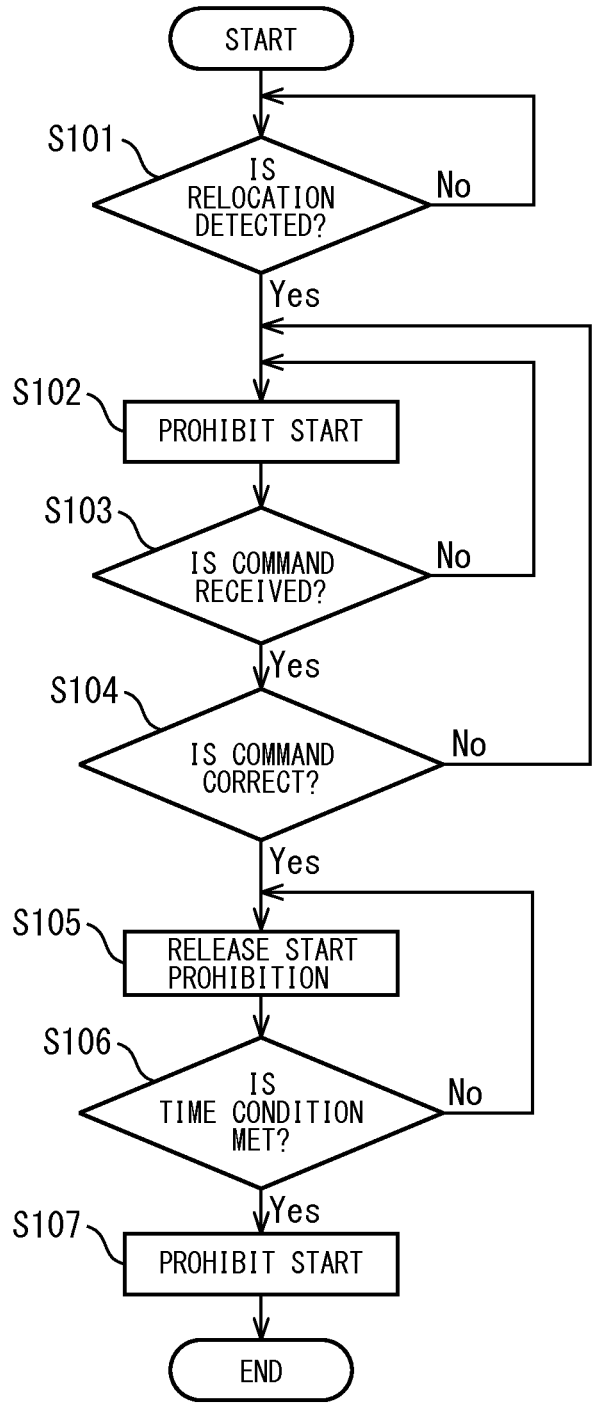
FIG. 4 is a flowchart showing the operation flow of the start limiting device according to the embodiment of the present invention.

FIG. 4 is a flowchart showing the operation flow of the start limiting device according to the embodiment of the present invention.

At step 5101, the relocation detection unit 15 determines whether the equipment 2 has been relocated. In the case where the relocation detection unit 15 detects the relocation of the equipment 2, the processing proceeds to step S102.

At step S102, the start prohibition unit 11 commands the control unit configured to centrally control the operation of the equipment 2 to prohibit the start. As a result, the start of the equipment 2 is prohibited, and the equipment 2 is not started by a user carrying out any operation unless the command reception unit 12 receives the temporary prohibition releasing command.

At step S103, the start limiting device 1 determines whether the command reception unit 12 has received the temporary prohibition releasing command. In the case where the temporary prohibition releasing command has been received, the processing proceeds to step S105 and in the case where the temporary prohibition releasing command has not been received, the processing returns to step S102.

At step S104, the start prohibition releasing unit 14 determines whether the received temporary prohibition releasing command is the correct temporary prohibition releasing command given to the equipment 2. In the case where the temporary prohibition releasing command is the correct temporary prohibition releasing command given to the equipment 2, the processing proceeds to step S105 and in other cases, the processing returns to step S102.

At step S105, the start prohibition releasing unit 14 commands the control unit configured to centrally control the operation of the equipment 2 to release the start prohibition. As a result, the start prohibition of the equipment 2 is released until the time condition determination unit 13 determines that the "time condition is met" at the next step S106.

At step S106, the time condition determination unit 13 determines whether the predetermined time condition has been met. In the case where it is determined that the time condition has been met, the processing proceeds to step S107 and in the case where it is determined that the time condition has not been met, the processing returns to step S105.

At step S107, the start of the equipment 2 is prohibited again. The prohibition of the start of the equipment 2 at step S107 is implemented by the start prohibition unit 11 commanding again the control unit of the equipment 2 to prohibit the start upon receipt of the command of the start prohibition releasing unit 14 or by withdrawing the start prohibition releasing command that is issued to the control unit of the equipment 2 by the start prohibition releasing unit 14. After the processing at step S107, the start of the equipment 2 is prohibited unless the start password set in advance to the equipment 2 is input.

As described above, through the processing at each of steps S105 to S107, during the period of time from when the command reception unit 12 receives the temporary prohibition releasing command until the time condition determination unit 13 determines that the "time condition is met", the prohibition of the start of the equipment 2 whose start is prohibited by the start prohibition unit 11 is released. Thus, it is possible for a user to adjust the period of time during which the start prohibition of the equipment 2 is released by inputting the temporary prohibition releasing command to the start limiting device 1 at desired timing, and therefore the intension of a user of relocating or using the equipment 2 is easily reflected. For example, it is possible for a user to freely set the relocation day of the equipment 2 without the need to take into consideration holidays.

For example, even in the case where relocation is carried out immediately before consecutive holidays or at the beginning of the consecutive holidays, it is possible for a user to take measures to stop the operation of the equipment 2 on holidays and to temporarily operate the equipment 2 on the business day by inputting the temporary prohibition releasing command to the start limiting device 1 on the business day after the consecutive holidays, and in the case where a user inputs the temporary prohibition releasing command to the start limiting device 1 but does not turn on the power source for some reason during the period of time during which the equipment 2 is to be temporarily operated, the day is not counted, and therefore it is economically advantageous.

Further, if the temporary prohibition releasing command is input to the start limiting device 1 by taking into consideration the business days of the maker (dealer) that issues the start password, it is possible to request the maker (dealer) to issue the start password for restart or to request the maker (dealer) to dispatch a service person to restart the machine tool during the period of time during which the start prohibition of the equipment 2 is released, and therefore it is possible to take measures to keep the period of time during which the equipment 2 cannot be restarted to a minimum.

Furthermore, for example, in the case of the method for detecting the relocation of the equipment 2 by detecting vibrations, if it is determined erroneously that the equipment 2 has been relocated, since vibrations are caused by an earthquake, even in the case where the maker (dealer) has suffered from a great earthquake and it is not possible for the maker (dealer) to issue the password to restart the equipment 2 or to dispatch a service person to restart the equipment 2 for a long period of time, by inputting the temporary prohibition releasing command to the start limiting device 1 by taking into consideration the state of recovery of the maker (dealer), it is also possible to appropriately release the start prohibition of the equipment 2 during the period of time from the earthquake until the maker (dealer) recovers, and therefore it is possible to reduce the economical loss that is caused, since it is not possible to obtain the start password to restart the equipment 2 or it is not possible to cause the maker (dealer) to dispatch a service person to restart the equipment 2.

Normally, the start password is set uniquely to the equipment 2 and for example, if a plurality of pieces of the equipment 2 exists in a user's factory, the start password is assigned to each piece of the equipment 2. On the other hand, the temporary prohibition releasing password may be set in common to a plurality of pieces of the equipment 2. A user of the equipment 2 may easily manage the password, by setting the common temporary prohibition releasing password to a plurality of pieces of the equipment 2 as described above.

In the above-described embodiment, the temporary prohibition releasing command is the temporary prohibition releasing password that is input to the start limiting device 1 via the input device, such as a keyboard and a ten key. As a modification example of the embodiment, it may also be possible to provide a command output unit (not illustrated) configured to output the temporary prohibition releasing command in the start limiting device 1. For example, it may also be possible to configure the command output unit as a mechanical switch so that the temporary prohibition releasing command is output from the mechanical switch to the command reception unit 12 when the mechanical switch is operated by a user. Alternatively, it may also be possible to provide a touch panel (not illustrated) on the start limiting device 1 and to display an icon for outputting the temporary prohibition releasing command on the touch panel so that the temporary prohibition releasing command is output from a control unit (not illustrated) of the touch panel to the command reception unit 12 when a user carries out an icon touch operation.

It is also possible to prevent the misuse of the temporary prohibition releasing command, by managing the temporary prohibition releasing command so that only a specific administrator among users can know the temporary prohibition releasing command. For example, it can be thought to design the mechanical switch as a switch provided with a key, or to manage the display of the icon by an ID card.

INDUSTRIAL APPLICABILITY

It is possible to apply the present invention to a device that limits the start of a machine tool. In particular, the present invention is effective for a device that limits the start of a machine tool whose relocation from the current owner to a third party, or whose relocation to another country is limited or prohibited based on law or contract.

CITATION LIST

1 start limiting device
2 equipment (machine tool)
11 start prohibition unit
12 command reception unit
13 time condition determination unit
14 start prohibition releasing unit
15 relocation detection unit
111 CPU
112 bus
113 ROM
114 RAM
115 input device
116 external storage medium drive device
117 display device

What is claimed is:

1. An operating control limiting method for an equipment which is controlled by a controller in order to perform predetermined operations, the operating control limiting method comprising the following steps of:
prohibiting the operating control of the equipment by the controller regardless of installation position of the equipment after the equipment is moved from a predetermined installation position; and
releasing the prohibition of the operating control of the equipment by the controller, wherein
the release from the prohibition after the prohibition of the operating control is performed by a receipt of a first command which continuously releases the prohibition of the operating control unit next time the equipment is moved, or a receipt of a second command which releases the prohibition of the operating control only within a predetermined fixed period,
the release from the prohibition of the operating control by the receipt of the second command is performs within the predetermined fixed period after the controller receives the second command,
after the prohibition of the operating control is released by the receipt of the second command, and the operating control is permitted during the predetermined fixed period, the operating control is prohibited regardless of installation position of the equipment, the release from the prohibition of the operating control by the receipt of the second command is restricted, and the release from the prohibition of the operating control by the receipt of the first command is permitted.

2. The operating control limiting method according to claim 1, wherein
the first command is a start password set in advance, and the second command is a command different from the start password.

3. The operating control limiting method according to claim 1, further comprising a step of:
determining whether the predetermined fixed period is elapsed,
wherein the step of determining whether the predetermined fixed period is elapsed comprises steps of counting a period of time during which the turned-on state of the power source of the equipment continues as one count and determining that the fixed period is elapsed when the counted number of counts reaches a predetermined number of times.

4. The operating control limiting method according to claim 3, wherein the step of determining whether the fixed period is elapsed comprises a step of counting one when a predetermined time elapses after the power source of the equipment is turned on.

5. The operating control limiting method according to claim 1, wherein
the second command is a temporary prohibition releasing password that is input via an input device.

6. The operating control limiting method according to claim 5, wherein
the temporary prohibition releasing password is set in common to a plurality of pieces of equipment.

7. The operating control limiting method according to claim 1, wherein
the second command is received from a switch which is configured to output the second command when a predetermined operation is carried out.

8. A machine tool comprising a controller which processes the operating control limiting method according to claim 1.

9. An machining control limiting method for a machine tool which performs predetermined machining on a machining subject by machining control of a controller, the machining control limiting method comprising the following steps of:

prohibiting the machining control of the machine tool by the controller regardless of installation position of the machine tool after the machine tool is moved from a predetermined installation position; and releasing the prohibition of the machining control of the machine tool by the controller, wherein the release from the prohibition of the machining control after the prohibition of the machining control is performed by a receipt of a first command which continuously releases the prohibition of the machining control until next time the machine tool is moved, or a receipt of a second command which releases the prohibition of the machining control only within a predetermined fixed period, the release from the prohibition of the machining control by the receipt of the second command is performed during the predetermined fixed period after the controller receives the second command, after the prohibition of the machining control is released by the receipt of the second command, and the prohibition of the machining control is permitted during the predetermined fixed period, the machining control is prohibited regardless of installation position of the machine tool, the release from the prohibition of the machining control by the receipt of the second command is restricted, and the release from the prohibition of the machining control by the receipt of the first command is permitted.

* * * * *